United States Patent
Shimazoe et al.

(10) Patent No.: US 8,628,894 B2
(45) Date of Patent: Jan. 14, 2014

(54) FUEL CELL SEALING STRUCTURE COMPRISING STEPPED GAS DIFFUSION LAYERS

(75) Inventors: Toshihiro Shimazoe, Fujisawa (JP); Yoshihiro Kurano, Fujisawa (JP); Shigeru Watanabe, Fujisawa (JP)

(73) Assignee: NOK Corporation (JP)

( * ) Notice: Subject to any disclaimer, the term of this patent is extended or adjusted under 35 U.S.C. 154(b) by 359 days.

(21) Appl. No.: 13/124,032

(22) PCT Filed: Oct. 6, 2009

(86) PCT No.: PCT/JP2009/067368
§ 371 (c)(1),
(2), (4) Date: Apr. 13, 2011

(87) PCT Pub. No.: WO2010/050339
PCT Pub. Date: May 6, 2010

(65) Prior Publication Data
US 2011/0200911 A1 Aug. 18, 2011

(30) Foreign Application Priority Data
Oct. 31, 2008 (JP) .................................. 2008-281715

(51) Int. Cl.
*H01M 8/02* (2006.01)
*H01M 8/10* (2006.01)

(52) U.S. Cl.
USPC ............ 429/483; 429/482; 429/463; 429/508

(58) Field of Classification Search
USPC ......... 429/481, 482, 483, 492, 509, 463, 508; 277/650; 264/259, 260, 271.1
See application file for complete search history.

(56) References Cited

U.S. PATENT DOCUMENTS

| 2003/0003342 | A1 | 1/2003 | Sugita et al. |
| 2004/0012159 | A1* | 1/2004 | Senda et al. .................. 277/650 |
| 2005/0249997 | A1 | 11/2005 | Tomimatsu et al. |
| 2007/0009780 | A1* | 1/2007 | Smith ............................ 429/35 |
| 2008/0152986 | A1 | 6/2008 | Fujibayashi |

FOREIGN PATENT DOCUMENTS

| JP | 2002-158018 A | 5/2002 |
| JP | 2003-017092 A | 1/2003 |
| JP | 2005-276820 A | 10/2005 |
| JP | 2008-034383 A | 2/2008 |
| JP | 2008-153174 A | 7/2008 |
| KR | 10-2008-0058139 A | 6/2008 |

* cited by examiner

*Primary Examiner* — Kenneth Douyette
(74) *Attorney, Agent, or Firm* — Harness, Dickey & Pierce, P.L.C.

(57) ABSTRACT

To effectively prevent deformation of an MEA and shift of GDLs, first GDLs, second GDLs, and separators are layered in order at both sides of the MEA in the thickness direction thereof, the gaskets which sandwich an end portion of the MEA outside the first GDLs and the second GDLs are made from rubber or a synthetic resin material having rubber-like elasticity and integrally provided on the separators respectively, the first GDLs have end portions which are formed so as to protrude beyond outer peripheries of the second GDLs, and the gaskets have support step portions which can position and support the end portions of the first GDLs at the same height as the support height by the second GDLs.

4 Claims, 4 Drawing Sheets

FUEL CELL SEALING STRUCTURE COMPRISING STEPPED GAS DIFFUSION LAYERS

CROSS-REFERENCE TO RELATED APPLICATIONS

This is a national stage of International Application No. PCT/JP2009/067368 filed on Oct. 6, 2009 and published in the Japanese language. This application claims the benefit of Japanese Application No. 2008-281715, filed on Oct. 31, 2008. The disclosures of the above applications are incorporated herein by reference.

BACKGROUND OF THE INVENTION

1. Field of the Invention

The present invention relates to a sealing structure in which an MEA is sandwiched by gaskets integrally provided on separators arranged at both sides of the MEA via GDLs, in a fuel cell.

2. Description of the Conventional Art

There has been known a fuel cell structured such that a membrane electrode assembly (MEA) provided with a pair of electrode layers on both surfaces of a reaction membrane, porous first and second gas diffusion layers (GDL) laminated on both sides thereof in a thickness direction, and separators made of carbon or a metal are alternately arrange and laminate, and fuel gas or oxidation gas is circulated to the MEA via the first and second GDLs. In other words, the fuel cell is structured such as to generate electric power on the basis of an electrochemical reaction corresponding to a reverse reaction to a water electrolytic process, that is, a reaction for creating water from hydrogen and oxygen.

In this kind of fuel cell, it is necessary to seal the fuel gas, the oxidation gas, the water created by the reaction, the surplus oxidation gas, a refrigerant and the like, and a gasket for this purpose is provided. There has been known a gasket which is made of rubber or a synthetic resin material having rubber-like elasticity, is integrally provided on a surface of the separator, and is brought into close contact with the surface of the MEA.

FIG. 7 is a partial sectional view showing a sealing structure of a fuel cell in accordance with a conventional art in a separation state, and FIG. 8 is a partial sectional view showing it in a lamination state.

The fuel cell shown in FIG. 7 is structured such that first GDLs 102 and 103, second GDLs 104 and 105, and separators 106 and 107 are laminated in order on both sides in a thickness direction of an MEA 101 which is provided with a pair of electrode layers on both surfaces of a reaction membrane (an ion exchange membrane), and the MEA 101 or a reinforcing frame integrated with the MEA 101 is sandwiched by gaskets 108 and 109 which are integrally provided on the separators 106 and 107 respectively positioned at both sides thereof in the thickness direction and are made of rubber or a synthetic resin material having rubber-like elasticity, at an outer side of the first GDLs 102 and 103 and the second GDLs 104 and 105 (refer, for example, to Japanese Unexamined Patent Publication No. 2008-34383).

However, in the conventional sealing structure mentioned above, in the lamination state shown in FIG. 8, since a space S is formed between seal protrusions 108a and 109a in the gaskets 108 and 109, and the first GDLs 102 and 103 and the second GDLs 104 and 105, there is a risk that deformation of the MEA 101 is caused in this space S, and there is fear that the MEA 101 is broken at worst. Further, shift of the first GDLs 102 and 103 tends to be caused due to the existence of the space S.

SUMMARY OF THE INVENTION

Problem to be Solved by the Invention

The present invention is made by taking the points mentioned above into consideration, and a technical object of the present invention is to effectively prevent deformation of an MEA and shift of first GDLs, in a sealing structure in which an MEA is sandwiched by gaskets which are integrally provided on separators arranged at both sides of the MEA via GDLs.

Means for Solving the Problem

As a means for effectively solving the technical problem mentioned above, in accordance with a first aspect of the present invention, there is provided a sealing structure of a fuel cell in which first GDLs, second GDLs and separators are laminated in order on both sides in a thickness direction of an MEA, and the MEA or a reinforcing frame integrated with the MEA is sandwiched by gaskets which are integrally provided on the respective separators positioned at both sides thereof in the thickness direction and are made of rubber or a synthetic resin material having rubber-like elasticity, at an outer side of the first GDLs and the second GDLs, wherein end portions of the first GDLs are formed in such a size as to protrude beyond outer peripheries of the second GDLs, and support step portions capable of positioning the end portions of the first GDLs and capable of supporting them at a height which is approximately the same as a support height by the second GDLs are formed in the gaskets.

Further, in accordance with a second aspect of the present invention, there is provided the sealing structure of a fuel cell as recited in the first aspect, wherein at least one gasket of the gaskets on both sides in the thickness direction of the MEA or the reinforcing frame has a flat base portion which is bonded to the separator, and a seal protrusion which rises from the base portion, and the support step portion is formed by the base portion and a bottom portion of the seal protrusion.

Further, in accordance with a third aspect of the present invention, there is provided the sealing structure of a fuel cell as recited in the first aspect, wherein at least one gasket of the gaskets on both sides in the thickness direction of the MEA or the reinforcing frame has a flat seal surface, and the support step portion is formed in a step shape which has a depth from the seal surface corresponding to a thickness of the first GDL.

Effect of the Invention

In accordance with the sealing structure of the fuel cell on the basis of the first to third aspects of the present invention, since the end portions of the first GDLs protruding beyond the end portions of the second GDLs are positioned by the support step portions formed in the gaskets, and are supported on the support step portions at the same height as the second GDLs, such a space as to cause the deformation of the MEA is not formed between the gaskets, and the first GDLs and the second GDLs, and shift of the first GDLs is not caused.

DETAILED DESCRIPTION OF PREFERRED EMBODIMENTS

A description will be given below of preferable embodiments of the sealing structure of a fuel cell in accordance with the present invention with reference to the accompanying drawings. First of all, FIG. 1 is a partial sectional view showing a first embodiment of a sealing structure of a fuel cell in accordance with the present invention in a separation state, and FIG. 2 is a partial sectional view showing it in a lamination state.

Figure 1:
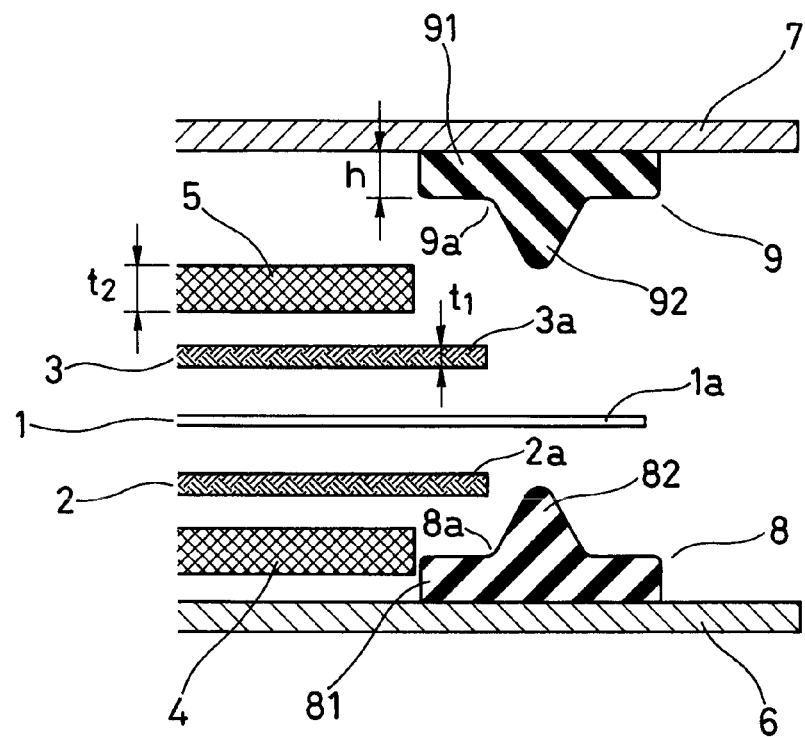
FIG. 1 is a partial sectional view showing a first embodiment of a seal structure of a fuel cell in accordance with the present invention in a separation state.
Figure 2:
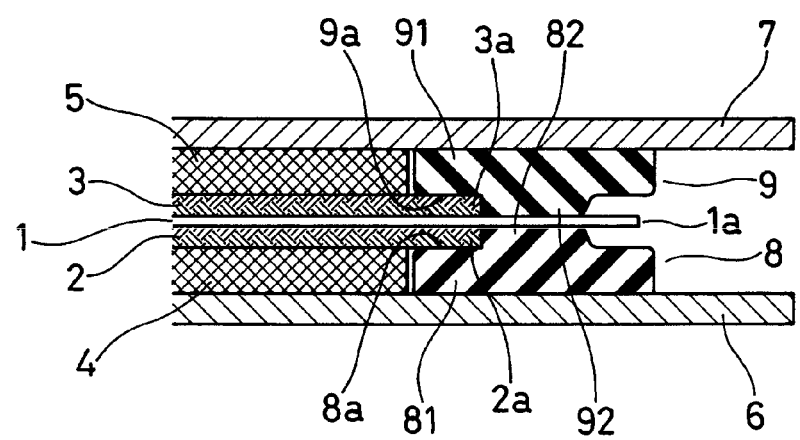
FIG. 2 is a partial sectional view showing the first embodiment of the seal structure of the fuel cell in accordance with the present invention in a lamination state.

In FIG. 1, reference numeral 1 denotes a membrane electrode assembly (MEA) having such a structure that a pair of electrode layers (not shown) are provided on both surfaces of a reaction membrane, reference numerals 2 and 3 denote first GDLs which are laminated on both sides in a thickness direction of the MEA 1 and are made of a metal porous material or a carbon porous material, reference numerals 4 and 5 denote second GDLs which are laminated on outer sides of the first GDLs 2 and 3 as seen from the MEA 1 and are made of a metal porous material or a carbon porous material, and reference numerals 6 and 7 denote separators which are laminated further on outer sides of the second GDLs 4 and 5 as seen from the MEA 1 and is made of a meal or a carbon. In this case, the first GDLs 2 and 3 have the same shape and the same size, the second GDLs 4 and 5 have the same shape and the same size, and the separators 6 and 7 have the same shape and the same size.

Reference numerals 8 and 9 denote gaskets which are made of rubber or a synthetic resin material having rubber-like elasticity, preferably an elastic material selected from an ethylene propylene rubber (EPDM), a silicone rubber (VMQ), a fluorine-contained rubber (FKM), a perfluoro rubber (FFKM) and the like, and are integrally bonded to the separators 6 and 7 respectively. The gaskets 8 and 9 have the same shape and the same size, are bonded to the separators 6 and 7, and have flat base portions 81 and 91, in which a height h is approximately the same as a thickness t2 of the second GDLs 4 and 5, and seal protrusions 82 and 92 which protrude to have a height larger than a thickness t1 of the first GDLs 2 and 3 from an middle position in a width direction of the base portions 81 and 91 and have a chevron sectional shape.

The first GDLs 2 and 3 are formed to have such a size as to protrude out of outer peripheries of the second GDLs 4 and 5, and the MEA 1 is formed to have such a size as to protrude out of outer peripheries of the first GDLs 2 and 3.

An end portion 1a of the MEA 1 protruding out of the outer peripheries of the first GDLs 2 and 3 is sandwiched between the seal protrusion 82 of the gasket 8 integrally provided on the separator 6 in a lower side of the figure, and the seal protrusion 92 of the gasket 9 provided integrally on the separators 7 in an upper side of the figure, as shown in FIG. 2, thereby preventing fuel gas (hydrogen) and oxidation gas which are supplied to the MEA 1, water and surplus gas which are created by an electrochemical reaction so as to be discharged, a refrigerant, and the like from leaking to an outer portion.

Support step portions 8a and 9a are formed in the gaskets 8 and 9 by upper surfaces of the base portions 81 and 91 toward an inner peripheral side, and bottom portions of the seal protrusions 82 and 92. Since the bottom portions at the inner peripheral side of the seal protrusions 82 and 92 extend in a plane shape which approximately corresponds to an outer peripheral shape of the first GDLs 2 and 3, and the height h of the base portions 81 and 91 is approximately the same as the thickness t2 of the second GDLs 4 and 5 as described above, the support step portions 8a and 9a can position the end portions 2a and 3a of the first GDLs 2 and 3 protruding out of the outer peripheries of the second GDLs 4 and 5, and can support them at the height h which is the same as the support height of the first GDLs 2 and 3 by the second GDLs 4 and 5.

Further, inner peripheral edges of the base portions 81 and 91 of the gaskets 8 and 9 extend in a plane shape corresponding to an outer peripheral shape of the second GDLs 4 and 5, and are positioned by the second GDLs 4 and 5 being loosely fitted to the inner peripheries of the base portions 81 and 91.

In a state in which a group of the parts having the structures mentioned above is set to one unit (a fuel battery cell), and a lot of the units are laminated and assembled by being fastened with bolts and nuts (not shown), the seal protrusions 82 and 92 of the gaskets 8 and 9 are brought into close contact with both the surfaces of the end portion 1a of the MEA 1 in a state of being appropriately compressed, as shown in FIG. 2. Further, the second GDLs 4 and 5 are positioned on the inner peripheries of the base portions 81 and 91 of the gaskets 8 and 9, and the end portions 2a and 3a protruding out of the second GDLs 4 and 5 in the first GDLs 2 and 3 laminated on the second GDLs 4 and 5 are positioned by the support step portions 8a and 9a of the gaskets 8 and 9 and supported at the height which is approximately the same as the support height of the first GDLs 2 and 3 by the second GDLs 4 and 5. Accordingly, it is possible to effectively prevent shift of the first GDLs 2 and 3 and the second GDLs 4 and 5.

Particularly, in the seal protrusions 82 and 92 of the gaskets 8 and 9, since the bottom portions (the support step portions 8a and 9a) thereof come to an approximately close contact fitting state to the end portions 2a and 3a of the first GDLs 2 and 3, on the basis of expansive deformation in a lateral direction due to compression, such a space as to allow deformation of the MEA 1 is not formed between the seal protrusions 82 and 92 of the gaskets 8 and 9, and the first GDLs 2 and 3 and the second GDLs 4 and 5, and the MEA 1 is firmly pressed from both sides in the thickness direction at the inner peripheral sides of the seal protrusions 82 and 92, by the end portions 2a and 3a of the first GDLs 2 and 3 which are fitted to the support step portions 8a and 9a of the gaskets 8 and 9. Therefore, it is possible to effectively prevent the MEA 1 from being deformed and being broken.

Figure 3:
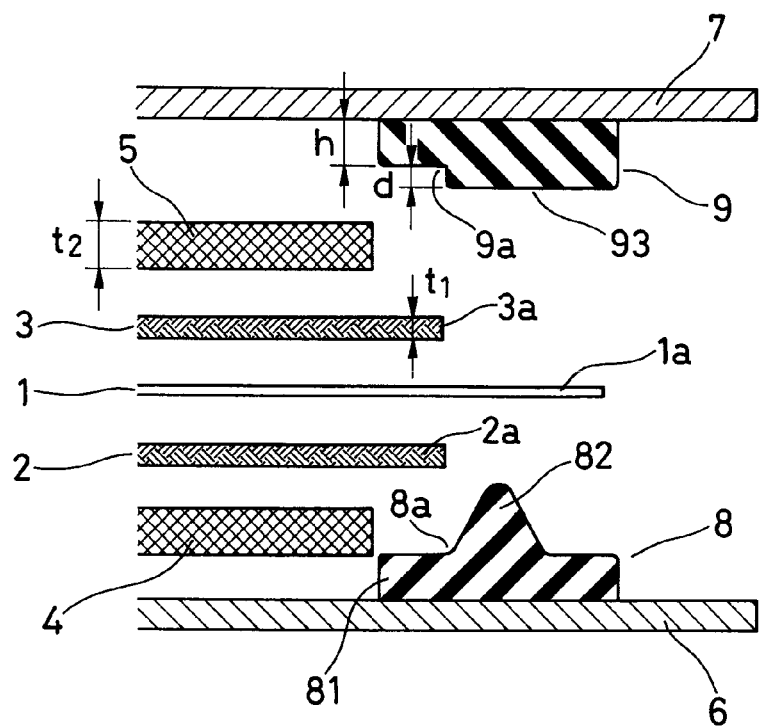
FIG. 3 is a partial sectional view showing a second embodiment of a seal structure of a fuel cell in accordance with the present invention in a separation state.
Figure 4:
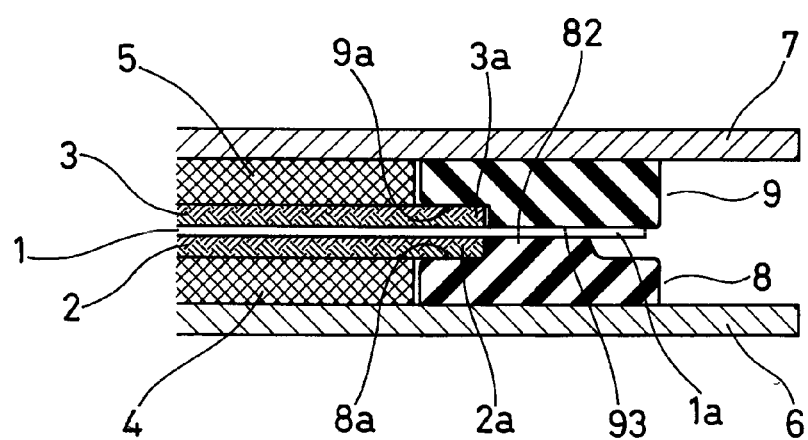
FIG. 4 is a partial sectional view showing the second embodiment of the seal structure of the fuel cell in accordance with the present invention in a lamination state.

Next, FIG. 3 is a partial sectional view showing a second embodiment of the sealing structure of the fuel cell in accordance with the present invention in a separation state, and FIG. 4 is a partial sectional view showing it in a lamination state.

A different point of this second embodiment from the first embodiment mentioned above exists in a matter that the gasket 9 integrally provided on the separator 7 in the upper side of the figure is formed in a flat seal shape having a flat seal surface 93, and the support step portion 9a is formed in such a shape that is depressed like a step from the seal surface 93. The structures of the other portions are the same as those of the first embodiment shown in FIGS. 1 and 2.

In detail, the gasket 9 is formed to have a height corresponding to a sum of the thickness t1 of the first GDL 3 and the thickness t2 of the second GDL 5, and the flat seal surface 93 brought into close contact with the end portion 1a of the MEA 1 is wider than a close contact width of the seal protrusion 82 of the gasket 8 (a close contact width with respect to the MEA 1), the support step portion 9a extends to the inner peripheral side of the seal surface 93 to have a plane shape which approximately corresponds to the outer peripheral shape of the first GDL 3, the height h of the bottom surface thereof is approximately the same as the thickness t2 of the second GDL 5, and the support step portion 9a is formed to have a depth d from the seal surface 93 corresponding to the thickness t1 of the first GDL 3. Accordingly, the support step portion 9a can position the end portion 3a of the first GDL 3 protruding out of the outer periphery of the second GDL 5 by fitting, and can support it at the height h which is approximately the same as the support height of the first GDL 3 by the second GDL 5.

In the second embodiment structured as mentioned above, in a state in which a group of the parts shown in FIGS. 3 and 4 is set to one unit (a fuel battery cell), and a lot of the units are laminated and assembled by being fastened with bolts and nuts (not shown), the seal protrusion 82 of the gasket 8 and the flat seal surface 93 of the gasket 9 are brought into close contact with both the surfaces of the end portion 1a of the MEA 1. In this connection, in the case that the gaskets 8 and 9 are structured such as to sandwich the end portion 1a of the MEA 1 by the seal protrusions 82 and 92, as shown in FIGS. 1 and 2 which are described previously, there is a risk that the end portion 1a of the MEA 1 receives bending moment so as to be deformed due to shift between surface pressure maximum portions made by the seal protrusions 82 and 92, if shift (offset) due to assembly precision exists even slightly. However, in accordance with the second embodiment, since the seal surface 93 of one gasket 9 is flat, the bending moment as mentioned above is not applied to the end portion 1a of the MEA 1, even if the slight shift exists between the gaskets 8 and 9 on both sides of the MEA 1.

Further, in this embodiment, the second GDLs 4 and 5 are positioned on the inner peripheries of the gaskets 8 and 9, and the end portions 2a and 3a protruding out of the second GDLs 4 and 5 in the first GDLs 2 and 3 laminated on the second GDLs 4 and 5 are positioned by the support step portions 8a and 9a of the gaskets 8 and 9 and are supported at the height which is approximately the same as the support height of the first GDL 2 and 3 by the second GDLs 4 and 5. Accordingly, it is possible to effectively prevent the shift of the first GDLs 2 and 3 and the second GDLs 4 and 5.

Further, since the support step portions 8a and 9a of the gaskets 8 and 9 come to an approximately close contact fitting state to the end portions 2a and 3a of the first GDLs 2 and 3, such a space as to allow deformation of the MEA 1 is not formed between the gaskets 8 and 9, and the first GDLs 2 and 3 and the second GDLs 4 and 5, and the MEA 1 is firmly pressed from both sides in the thickness direction by the end portions 2a and 3a of the first GDLs 2 and 3 which are fitted to the support step portions 8a and 9a of the gaskets 8 and 9. Accordingly, it is possible to effectively prevent the MEA 1 from being deformed and broken.

Figure 5:
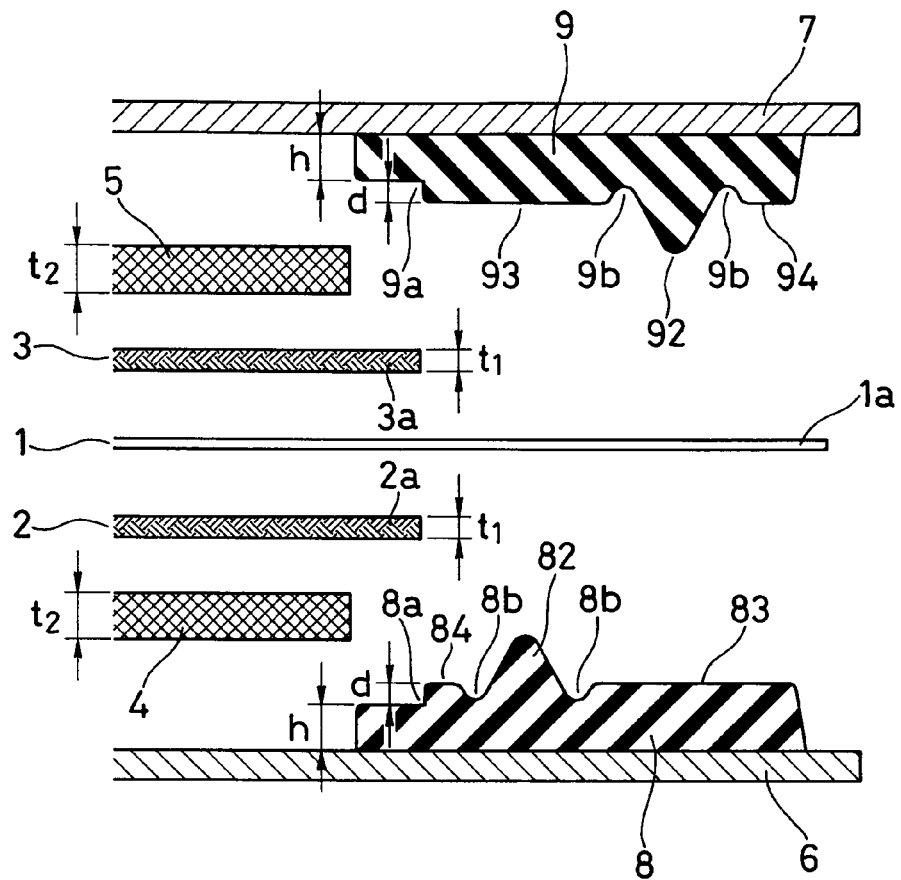
FIG. 5 is a partial sectional view showing a third embodiment of a seal structure of a fuel cell in accordance with the present invention in a separation state.
Figure 6:
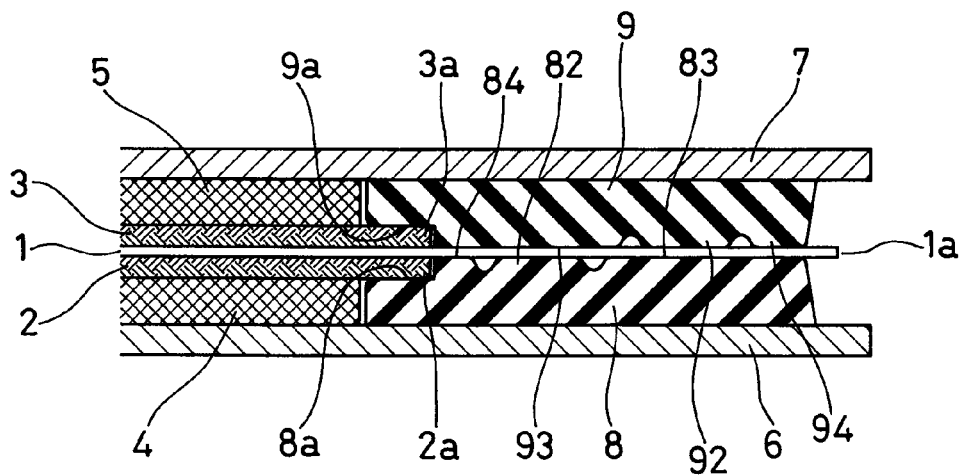
FIG. 6 is a partial sectional view showing the third embodiment of the seal structure of the fuel cell in accordance with the present invention in a lamination state.
Figure 7:
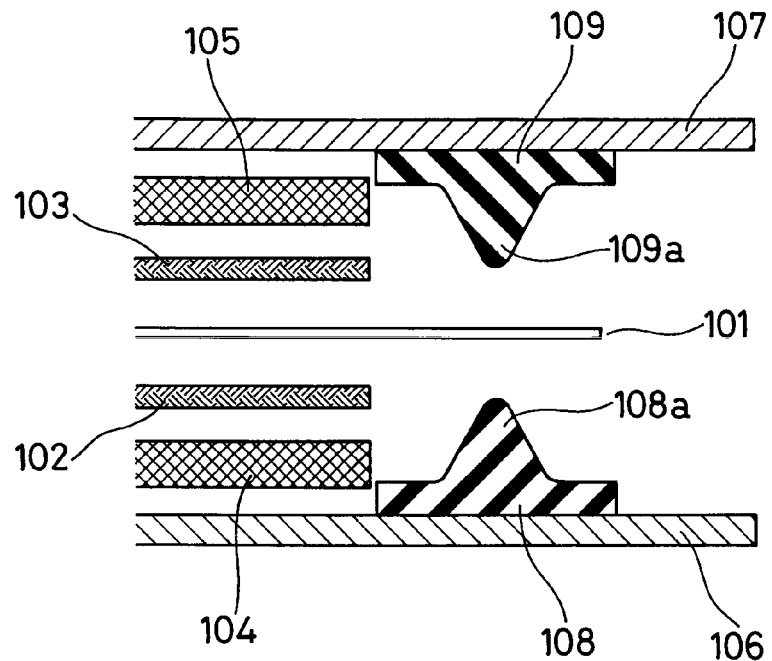
FIG. 7 is a partial sectional view showing a seal structure of a fuel cell in accordance with a conventional art in a separation state.
Figure 8:
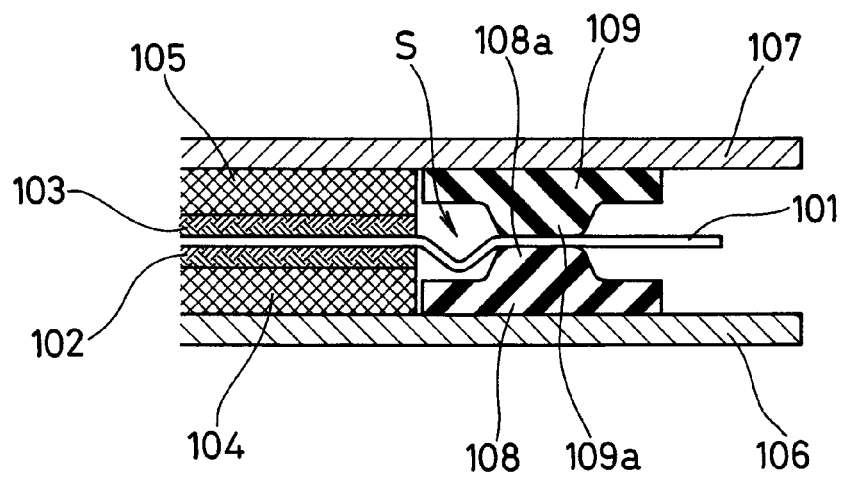
FIG. 8 is a partial sectional view showing the seal structure of the fuel cell in accordance with the conventional art in a lamination state.

Next, FIG. 5 is a partial sectional view showing a third embodiment of the sealing structure of the fuel cell in accordance with the present invention in a separation state, and FIG. 6 is a partial sectional view showing it in a lamination state.

A different point of this third embodiment from the first embodiment mentioned above exists in a matter that one gasket 8 has a flat seal surface 83 which is formed at a height corresponding to a sum of the thickness t1 of the first GDL 2 and the thickness t2 of the second GDL 4 on its outer peripheral side, a seal protrusion 82 which protrudes to have a height larger than the thickness t1 of the first GDL 2 from its inner peripheral side position and has a chevron sectional shape, and a flat pressing surface 84 which is formed at the same height as the seal surface 83 on its further inner peripheral side, and the other gasket 9 has a flat seal surface 93 which is opposed to the seal protrusion 82 and the pressing surface 84 of the gasket 8 and formed at a height corresponding to a sum of the thickness t1 of the first GDL 3 and the thickness t2 of the second GDL 5 on its inner peripheral side, a seal protrusion 92 which protrudes to have a height larger than the thickness t1 of the first GDL 3 from its outer peripheral side position and has a chevron sectional shape, and a flat pressing surface 94 which is opposed to an outer peripheral portion of the seal surface 83 of the gasket 8 and is formed at the same height as the seal surface 93 on its further outer peripheral side. In this case, the MEA 1, the first GDLs 2 and 3, the second GDLs 4 and 5, the separators 6 and 7 and the like are the same as those of the first embodiment shown in FIGS. 1 and 2.

The seal surface 83 of the gasket 8 is wider than a close contact width of the seal protrusion 92 of the gasket 9 opposed thereto (a close contact width with respect to the MEA 1), and the support step portion 8a is formed in such a shape as to be depressed like a step from an inner peripheral side of the pressing surface 84, extends in a plane shape which approximately corresponds to the outer peripheral shape of the first GDL 2, has a bottom surface in which a height h is approximately the same as the thickness t2 of the second GDL 4, and is formed at a depth d corresponding to the thickness t1 of the first GDL 2 from the pressing surface 84 (the seal surface 83). Accordingly, the support step portion 8a can position the end portion 2a of the first GDL 2 protruding out of the outer periphery of the second GDL 4 by fitting, and can support it at the height h which is approximately the same as the support height of the first GDL 2 by the second GDL 4.

Similarly to the above, the seal surface 93 of the gasket 9 is wider than a close contact width of the seal protrusion 82 of the gasket 8 opposed thereto (a close contact width with respect to the MEA 1), and the support step portion 9a is formed in such a shape as to be depressed like a step from an inner peripheral side of the seal surface 93, extends in a plane shape which approximately corresponds to the outer peripheral shape of the first GDL 3, has a bottom surface in which a height h is approximately the same as the thickness t2 of the second GDL 5, and is formed at a depth d corresponding to the thickness t1 of the first GDL 3 from the seal surface 93. Accordingly, the support step portion 9a can position the end portion 3a of the first GDL 3 protruding out of the outer periphery of the second GDL 5 by fitting, and can support it at the height h which is approximately the same as the support height of the first GDL 3 by the second GDL 5.

In this case, reference symbols 8b and 9b respectively denote clearance grooves which are formed in bottom portions of the seal protrusions 82 and 92 for allowing expansive deformation in a lateral direction due to with the compression of the seal protrusions 82 and 92.

In the third embodiment structured as mentioned above, in a state in which a group of the parts shown in FIGS. 5 and 6 is set to one unit (a fuel battery cell), and a lot of the units are laminated and assembled by being fastened with bolts and nuts (not shown), the seal protrusions 82 of the gasket 8 and the flat seal surface 93 of the gasket 9 which are opposed to each other, and the seal protrusion 92 of the gasket 9 and the flat seal surface 83 of the gasket 8 which are opposed to each other at their outer peripheral side are brought into close contact with both the surfaces of the end portion 1a of the MEA 1 respectively. Accordingly, even if slight shift (offset) exists due to assembly precision, there is no risk that the end portion 1a of the MEA 1 is deformed by bending moment being applied. Further, since plural steps of close contact seal portions are formed, an excellent sealing performance can be achieved.

Further, even in this embodiment, the second GDLs 4 and 5 are positioned on the inner peripheries of the gaskets 8 and 9, and the end portions 2a and 3a protruding out of the second GDLs 4 and 5 in the first GDLs 2 and 3 laminated on the second GDLs 4 and 5 are positioned by the support step portions 8a and 9a of the gaskets 8 and 9 and supported at the height which is approximately the same as the support height of the first GDLs 2 and 3 by the second GDLs 4 and 5. Accordingly, it is possible to effectively prevent shift of the first GDLs 2 and 3 and the second GDLs 4 and 5.

Further, since the support step portions 8a and 9a of the gaskets 8 and 9 come to an approximately close contact fitting state to the end portions 2a and 3a of the first GDLs 2 and 3, such a space as to allow deformation of the MEA 1 is not formed between the gaskets 8 and 9, and the first GDLs 2 and 3 and the second GDLs 4 and 5, and the MEA 1 is firmly pressed from both sides in the thickness direction, by the end portions 2a and 3a of the first GDLs 2 and 3 which are fitted to the support step portions 8a and 9a of the gaskets 8 and 9. Therefore, it is possible to effectively prevent the MEA 1 from being deformed and being broken.

Further, since the pressing surface 84 in the inner peripheral side of the gasket 8 and the flat seal surface 93 of the gasket 9, and the pressing surface 94 in the outer peripheral side of the gasket 9 and the flat seal surface 83 of the gasket 8 are brought into close contact with both the surfaces of the end portion 1a of the MEA 1, rigidity in the thickness direction by the gaskets 8 and 9 is enhanced, and it is possible to define a lamination distance between the separators 6 and 7 with high precision.

In this case, in each of the embodiments mentioned above, the description is given of the structure in which the gaskets 8 and 9 are brought into close contact with both the surfaces of the MEA 1. However, the present invention can be applied to a structure in which a film-like reinforcing frame is integrally provided on the outer peripheral portion of the MEA 1, and the reinforcing frame is sandwiched by the gaskets 8 and 9 to be in contact with them.

What is claimed is:

1. A sealing structure of a fuel cell comprising:
   first gas diffusion layers, second gas diffusion layers and separators laminated in this order on both sides in a thickness direction of a membrane electrode assembly; and
   gaskets which are provided on the respective separators at both sides of the membrane electrode assembly in the thickness direction to sandwich said membrane electrode assembly or a reinforcing frame integrated with the membrane electrode assembly, the gaskets being made of an elastomeric material and being located at an outer side of said first gas diffusion layers and said second gas diffusion layers,
   wherein end portions of said first gas diffusion layers protrude beyond outer peripheries of said second gas diffusion layers,
   said second gas diffusion layers are positioned on inner peripheries of said gaskets,
   the end portions of said first gas diffusion layers are fitted to and positioned by support step portions formed in said gaskets, and the end portions of said first gas diffusion layers are positioned and supported by the support step portions at a height which is approximately the same as a support height of said second gas diffusion layers.

2. The sealing structure of a fuel cell as claimed in claim 1, wherein at least one gasket of the gaskets on both sides in the thickness direction of the membrane electrode assembly or the reinforcing frame has a flat base portion which is bonded to the separator, and a seal protrusion which rises from the base portion, the support step portion is formed by said base portion and a bottom portion of said seal protrusion, and said support step portion is brought into close contact with and fitted to the end portion of said first gas diffusion layers by expansive deformation in a lateral direction of said bottom portion due to compression of said seal protrusion.

3. The sealing structure of a fuel cell as claimed in claim 1, wherein at least one gasket of the gaskets on both sides in the thickness direction of the membrane electrode assembly or the reinforcing frame has a flat seal surface, and the support step portion is formed in a step shape which has a depth from said seal surface corresponding to a thickness of the first gas diffusion layers.

4. A sealing structure of a fuel cell comprising:
   a membrane electrode assembly;
   a pair of first gas diffusion layers respectively laminated onto opposite sides of the membrane electrode assembly;
   a pair of second gas diffusion layers respectively laminated onto the pair of first gas diffusion layers opposite the membrane electrode assembly, end portions of the first gas diffusion layers protruding beyond outer peripheries of the second gas diffusion layers;
   a pair of separators respectively laminated onto the pair of second gas diffusion layers opposite the first gas diffusion layers; and
   a pair of elastomeric gaskets respectively provided on the separators, the gaskets sandwiching the membrane electrode assembly or a reinforcing frame integrated with the membrane electrode assembly therebetween, the gaskets being located at an outer side of the first and second gas diffusion layers, and the gaskets including support step portions that are fitted to the end portions of the first gas diffusion layers,
   wherein the support step portions have a support surface supporting the end portions of the first gas diffusion layers, the support surface being approximately coplanar with a surface of the second gas diffusion layers that is laminated to the first gas diffusion layers.

* * * * *